United States Patent
Keithley et al.

(10) Patent No.: US 6,862,375 B1
(45) Date of Patent: Mar. 1, 2005

(54) SKEW COMPENSATION FOR RASTER IMAGE TRANSFER DEVICE

(75) Inventors: Douglas G. Keithley, Boise, ID (US); James R. Emmert, Boise, ID (US); Brent D. Rasmussen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 09/680,546

(22) Filed: Oct. 4, 2000

(51) Int. Cl.[7] ................................................. G06K 9/36
(52) U.S. Cl. ....................... 382/289; 382/296; 358/444; 358/452
(58) Field of Search ................................. 358/444, 442, 358/448, 525, 451, 452, 449, 524, 1.12, 1.18, 1.16, 1.17, 498, 496, 401, 296; 382/289, 296, 291, 295, 319, 318, 298, 293, 300, 299; 399/395, 394; 347/139, 129

(56) References Cited

U.S. PATENT DOCUMENTS 5,181,260 A * 1/1993 Kurosu et al. .............. 382/289
6,340,984 B1 * 1/2002 Ui et al. ..................... 399/394
6,342,909 B1 * 1/2002 Joichi et al. ................ 347/129

* cited by examiner

Primary Examiner—Cheukfan Lee

(57) ABSTRACT

A multifunction image-transfer system with printing, scanning, digital copying, and facsimile capabilities detects skew as sheet media is fed. A skew processor digitally skews image data as a function of sheet-feed skew detected by skew detectors. In the context of a scanning operation, an image-bearing document is fed to a scanner device, which generates a digital raster image. A buffer stores portions of the digital image as it is transferred. The image data in the buffer is digital skew-compensated before it is transferred to a host computer. In the context of a printing operation, raster print data is stored in the memory buffer and then skew compensated before the image is printed to the print media. The digital skew compensation allows mechanical tolerances in such systems to be relaxed and system lifetimes to be lengthened since "true" images can result despite moderate media skew.

8 Claims, 3 Drawing Sheets

SKEW COMPENSATION FOR RASTER IMAGE TRANSFER DEVICE

BACKGROUND OF THE INVENTION

The present invention relates to image-transfer devices and, more particularly, to devices, such as scanners and printers, that transfer images between digital and hard-copy formats.

Much of modern progress is associated with the increasing prevalence of computers that manipulate data in digital form. Peripherals such as scanners and printers provide important links between the human and computer realms. In addition, related technologies, such as facsimile (fax) machines and digital copiers are becoming evermore prevalent.

Most image-transfer devices, excluding some flat-bed scanners, require some form of sheet-feed device, either for handling documents to be scanned or for handling blank media to which an image is to be transferred. (As used herein, "blank media" includes all media to which images are to be added, even media with pre-existing images, such as letterhead stationery.) Many scanners use automated document feeders. Printers typically include a blank-media sheet feeder. In fact, many printers have mechanisms that support two or more media sources. Devices that support both printing and scanning, such as fax machines and multifunction office machines, typically use both document feeders and blank-media feeders.

As the costs of electronic and optical components are falling, sheet-feed mechanisms are consuming increasing proportions of the costs of image-transfer devices. The market expectation is that the sheet-feeding mechanisms draw media straight (i.e., "true") through the imaging transfer section of a device. In many cases, the true media feed is to be accomplished with a wide variety of sheet media, including paper of different weights, card stock, transparency film, and photo-paper. Moreover, sheet feeding must be performed to specifications over thousands of sheets.

Deviations from straight paper feeding can result in image skew, i.e., the image is tilted relative to the media. In the case of scanning, the digital image is tilted relative to the sheet-media source. In the case of printing, the sheet-media image is tilted relative to the digital image source. In general, perceptible skew is highly undesirable, although unperceptible skew may be tolerable for some applications. However, manufacturing a sheet-feed mechanism that maintains skew within acceptable tolerances for different media over thousands of feeds is costly.

There is scanning software that can be used to correct for skew in an image after it has been completely transferred to a host computer. Such software makes assumptions about what an image should look like, e.g., the software assumes lines should be either horizontal or vertical, rather than oblique; such software may not be effective for images that do not conform to those assumptions. Furthermore, such software only applies to scanning, not to printing. What is needed is a more economical method for maintaining printed and scanned image skew within acceptable tolerances regardless of the type of image.

SUMMARY OF THE INVENTION

The present invention provides an image-transfer device and method for detecting mechanical skew of sheet media fed thereby and skewing digital image data as a function of the detected sheet-feed skew to compensate for the sheet feed skew. The digital image data ad can be acquired from the media (e.g., in the case of a scanner) or it can be to be applied to the media (e.g., in the case of a printer). The invention thus helps provide for "true" images despite skewed media feeds. In one embodiment, the invention comprises a sheet-feed mechanism, a media-skew detector, a digital memory for storing image data, and a controller. The stored image data corresponds to an image that may require skew compensation. The controller generates a skew function from the media-skew determination and then applies the skew function to the uncompensated image data to yield skewed image data. The invention may also provide for skew functions that achieve objectives, such as image scaling, in addition to image skewing.

The invention does not require that the entire image to be skewed be represented in memory at one time. Each pixel in the skew-compensated image can be characterized as a function of a small number of neighboring pixels in the uncompensated image. Thus, only a fraction, less than half, of the data for the uncompensated image need be available at any one time. Thus, the memory can be a buffer that stores data corresponding to some, but not all of the raster lines of the uncompensated image.

The invention provides an economical data-processing approach to compensating for skewed media feeds. In the case of a print operation, an image may be skew-compensated in the digital domain before it is applied to media. In the case of a scan operation, the image may be skew-compensated in the digital domain after it is acquired from a document. The skew compensation in the digital domain allows mechanical sheet-feed tolerances to be relaxed. In addition, device lifetimes can be extended, as degradation in sheet-media handling over time can be compensated electronically.

DETAILED DESCRIPTION OF THE PREFERRED EMBODIMENTS

Figure 1:
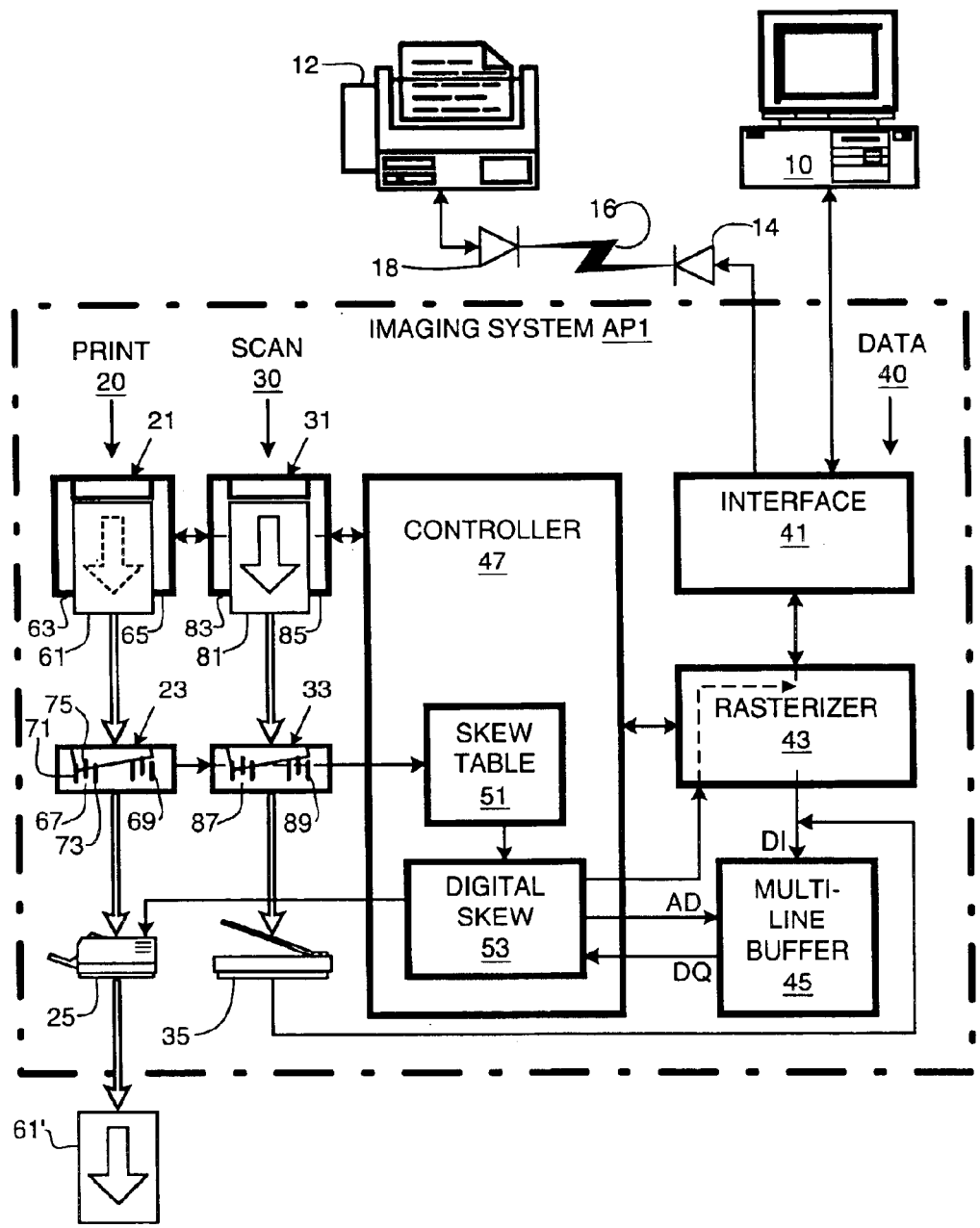
FIG. 1 is a schematic illustration of a multifunction imaging system including scanning and printing functions in accordance with one embodiment of the present invention.
Figure 2:
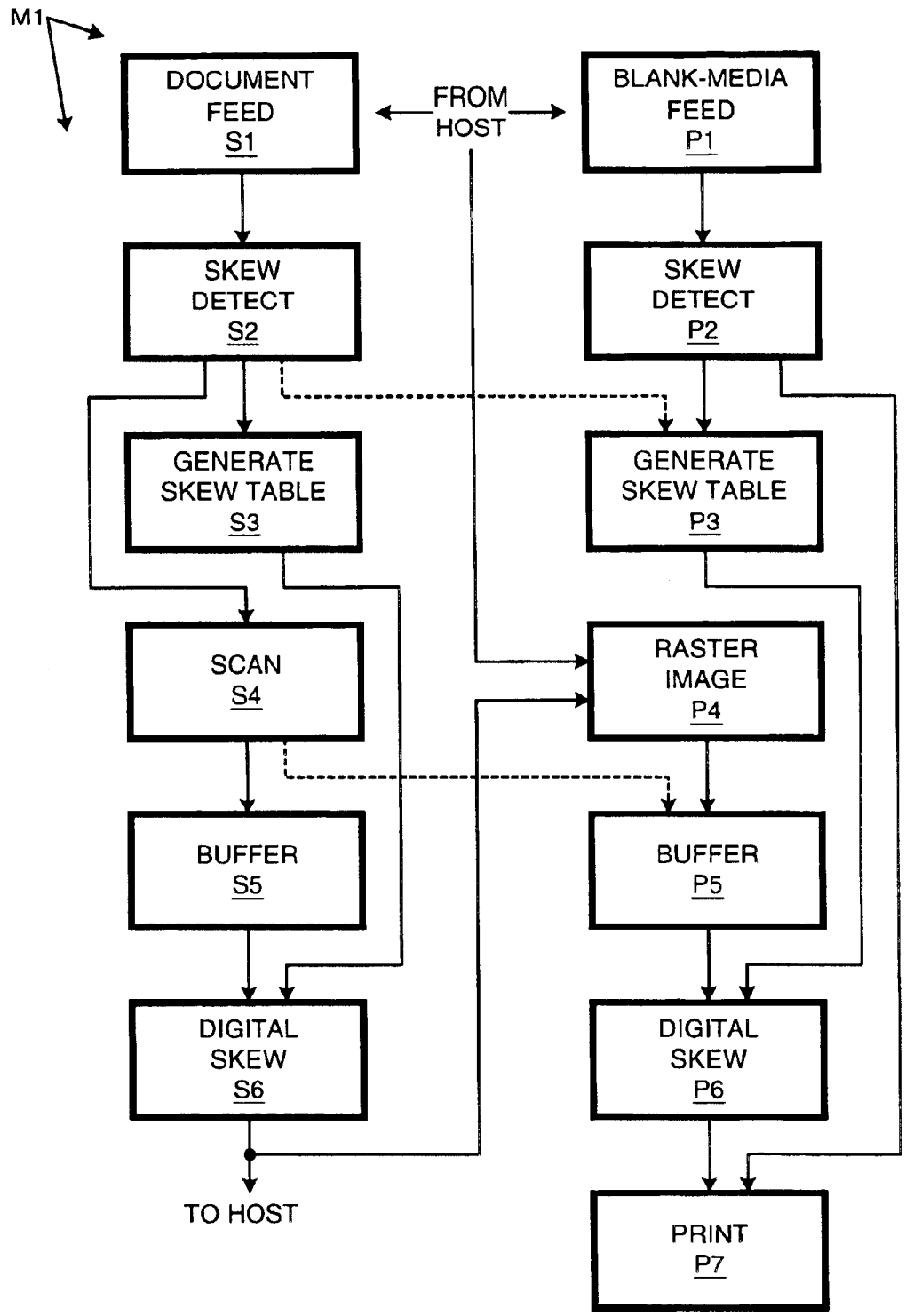
FIG. 2 is a flow chart for a method of one embodiment of the invention practiced in the context of the system of FIG. 1.

In accordance with the present invention, a multifunction imaging system AP1 provides for print, scan, digital copy, and facsimile functions, as shown in FIG. 1. The print function operates in response to commands and print data received from a host computer 10. The scan function can be initiated by host computer 10 or locally, in which case system AP1 signals host computer 10 that it is to be receiving scan data. Digital copying involves scanning and then printing and can be handled on a standalone basis.

Faxing, which allows graphic communications with a remote facsimile machine 12, has both transmit and receive modes. Transmit mode is similar to the scan function, while receive mode is similar to the print function. To enable faxing, imaging system AP1 is plugged into a telecommunications outlet 14, which is coupled via a telecommunications system 16 to another telecommunications outlet 18 into which remote facsimile 12 machine is plugged.

Imaging system AP1 provides a print-media path 20, a scan-media path 30, and a data path 40. Print-media path 20 inlcudes a blank-media sheet feeder 21, a skew detector 23, and a laser-image transfer device 25, the output of which is print media bearing a printed image. Scan-media path 30 includes a document feeder 31, a skew detector 33, and a scanning device 35, the output of which is rasterized image data. Data path 40 includes a host-computer interface 41 for interfacing with a host computer 10, a rasterizer 43, a multi-line buffer 45, and a controller 47. Controller 47 includes a re-writable skew table 51 and a skew processor 53 used for "skewing" digital-image data. Multi-line buffer 45 is a dual-ported RAM with an address port AD, a data input DI, and a data output DQ.

A typical print operation can begin with host computer 10 sending print commands and data to imaging system AP1, where they are received by rasterizer 43 via interface 41. Rasterizer 43 performs a variety of print-control functions, including rasterizing vector image data into a raster image format. Rasterizer 43 also can convert between some standard raster formats and its internal raster format. If rasterizer 43 receives data in its internal raster format, it can simply store that raster data. Rasterizer 43 has sufficient memory to store 1-bit-per-pixel (as defined by the scan and print resolutions) for a full-sized (e.g., letter-sized or A4-sized) image. Rasterizer 43 can also parse print-control signals and forward them to controller 47.

In response to receiving a print-control signal from rasterizer 43, controller 47 commands blank-media sheet feeder 21 to feed a sheet of blank media 61. Blank-media feeder 21 includes sheet-media guides 63 and 65, the latter being movable to match the width of the media being fed. The media width as determined by the setting of sheet-media guide 65 is communicated to controller 47. Guides 63 and 65 help limit, but do not necessarily eliminate, skewing of media 61 as it is fed.

As blank media 61 is fed, it passes skew detector 23. Skew detector 23 has two edge detectors 67 and 69. Each edge detector 67, 69 includes a light-emitting diode 71, a photo-diode (light-detecting diode) 73, and a lever 75. When a sheet begins to feed, light-emitting diodes 71 are activated and photo-diodes 73 are monitored by controller 47. Before a sheet arrives, photo-diodes 71 detect light from their respective light-emitting diodes 73. As the leading end of a sheet is fed, its weight depresses each lever 75 so that it pivots into position between the respective light-emitting diode 71 and the respective photo-diode 73, breaking (occluding) the optical link. The resulting high-to-low detection signal transitions are detected by controller 47.

Edge detector 69 is mechanically coupled to the movable sheet-media guide 65 so that edge detectors 67 and 69 are positioned about one centimeter (1 cm) from each lateral edge of the sheet being fed. The position of movable sheet-media guide 65 is communicated to controller 47, so that the width of the media is known. This width is used along with other information in generated skew table 51.

If the sheet feed is true, edge detectors 67 and 69 indicate occlusion simultaneously. In this case, there is no skew and thus no need for skew compensation. If one of the edge detectors 67, 69 indicates occlusion before the other, then there is skew. Since the media is fed at a known rate, the time between occlusion of one edge detector and the other indicates a skew length, the distance by which one lateral edge of the media 61 leads the other. Controller 47 records which edge detector is occluded first to determine the direction of skew. Controller 47 also times the interval between occlusions to determine the length associated with the skew. This length is divided by the known media width (as determined from the known position of movable media guide 65) to determine a skew angle.

Controller 47 uses the determined skew angle to generate the contents of skew table 51. Skew table 51 indicates what function is to be used in generating a skew-compensated image. In general, the function can be a weighted average of color values or toner amounts associated with one pixel for one or more pixels in an uncompensated digital image. An exemplary skew-compensation function is discussed further below with reference to FIG. 3.

Concurrent with the feeding of blank media 61, rasterizer 43 begins outputting raster image data to multi-line buffer 45. In other embodiments, the data is not reformatted as it is sent to a buffer. In this case, 1-bit-per-pixel data is converted to 7-bit per pixel data to effect resolution enhancement. This conversion is performed "on-the-fly", obviating the need for a memory large enough to store a full-sized sheet's worth of 7-bit-per-pixel image data. Instead, a fraction at a time of the 7-bit data is stored in multi-line buffer 45.

Multi-line buffer 45 is a dual-port random-access-memory functioning as a 120-row and 4800-column table of 8-bit storage locations (seven bits of each storage location are used during a print opreation). The 4800 columns correspond to eight-inch wide media (letter size with ¼" margins) at 600 dots-per-inch (dpi). The 120 rows corresponds to 0.2" at 600 dpi in the direction of media travel. The 0.2" corresponds to the maximum skew that can be digitally corrected in system AP1.

Digital-skew processor 53 transmits skew-compensated raster image data to laser printer device 25. This raster image data has the same 7-bit format as the data in buffer 45. However, the image represented by the output of processor 53 is skewed to the extent indicated by skew detector 23. The skew-compensation function is applied solely to data stored in multi-line buffer 45 at any given time (as opposed to other image data not presently stored in buffer 45).

The skew-compensated data is received by laser-printer device 25. The data is converted to pulse-width modulation signals, which are used to drive a laser. The laser, in turn, determines the pattern of toner to be applied to the sheet-media 61 being fed through device 25. The result is an image-bearing document 61' in which the printed image is aligned with respect to the media as it would be in the absence of sheet-feed skew and without digital skew compensation.

A scanning operation can begin with inserting an image-bearing document 81 (the image can be text) in document feeder 31 and having host computer 10 transmit a scan command to imaging system AP1. This command is forwarded by interface 41 and rasterizer 43 to controller 47, which transmits it to document feeder 31. This command initiates feeding of the image-bearing document 81 so that it is detected by skew detector 33. Skew is limited by document-feed guides 83 and 85. Document-feed guide 85 can be moved so that the paper guide path matches width of document 81.

Skew detector 33, essentially identical to skew detector 23, includes edge detectors 87 and 89. Controller 47 determines skew length from the skew detection signals provided by skew detector 33. Skew angle is determined by dividing skew length by the document width indicated by movable document-feed guide 85, to which edge detector 89 is mechanically coupled. Scanner device 35 provides 8-bit-per-pixel raster-image data to buffer 45. Skew processor 53 skew-compensates the data in buffer 45 to yield 8-bit-per-pixel skew-compensated data. This data is transmitted through rasterizer 43 and interface 41 to host computer 10 for use by application programs running thereon.

Note that a fax-receive operation is essentially the same as a print operation except that the data and control signals are received from remote fax 12. Likewise, a fax-transmit operation is essentially the same as a scan operation, except the scanned data is formatted according to fax standards after skew-compensation. The fax data is then sent to fax machine 12 via communications network 16.

A digital copy operation involves both scan and print operations initiated locally at the imaging system AP1. Such an operation is described here with reference to the flow chart of a method M1 of the invention that is practiced in the context of system AP1. Method M1 also encompasses the print, scan, and fax operations described above. For example, steps S1 to S6 are the same as for a scan operation or a fax-transmit operation, while steps P1 to P7 are the same as for a print operation or a fax-receive operation.

In response to a manual button push, an image-bearing document is fed at scan-related step S1. In a scan operation step S1 is preceded by a command from a host, while in a fax-transmit operation, step S1 is preceded by commands from a remote fax.

At step S2, the degree of skew is detected. At step S3, a skew function (e.g., as a skew table) is generated at least in part as a function of the detected skew. At step S4, the document is scanned, yielding uncompensated image data. At step S5, the uncompensated glib image data is buffered; (it may be converted prior to buffering). At step S6, skew compensation is applied to the buffered data, using the skew function generated at step S3.

After step S6 of the digital copy operation, the skew-compensated data is input to rasterizer 43. In the present case, the skew-compensated data is input via rasterizer 43, and format-converted as appropriate. In a scan operation, the skew-compensated data is output to a host computer or network; in a fax-transmit operation, the skew-compensated data (after appropriate conversion to fax format) is transmitted to a remote fax.

Once the scan-skew-compensated data is stored by rasterizer 43, and preferably before this storage is completed, blank media is fed at step P1. In a print operation, step P1 can begin in response to a computer command, while in a fax-receive operation, P1 can begin in response to a command from a remote fax. In any case, blank-media skew is detected at step P2, and used to generate a blank-media skew function (e.g., skew table contents) at step P3.

With appropriate format conversion, scan-skew-compensated image data is buffered at step P5. Digital print-skew compensation is applied at step P6 using the skew function generated at step P3. Note that other functions can be implemented in step P6, for example, the image can be scaled (enlarged or reduced). This can happen in response to user selection of scaling factors which are received by controller 47 and used to generate the skew function. The resulting print-skew-compensated image is used in generating the actual sheet-media-based copy at print step P7.

Method M1 provides for an alternative digital copy procedure in which only one skew-compensation is required. In this procedure steps skew-table generation step S3, buffer step S5, and digital-skew step S6 are merged into their print-side counterparts. The document skew detected at step S2 is used in conjunction with blank-media skew detected at step P2 to generate a skew table at step P3, as indicated by the dotted line into step P3. The scanned image produced at scan step S4 is buffered at step P5. The digital skew at step P6 uses the table generated from both document and blank-media feeds at step P3. The document skew can be stored for use in successive skew tables when multiple copies are required.

Figure 3:
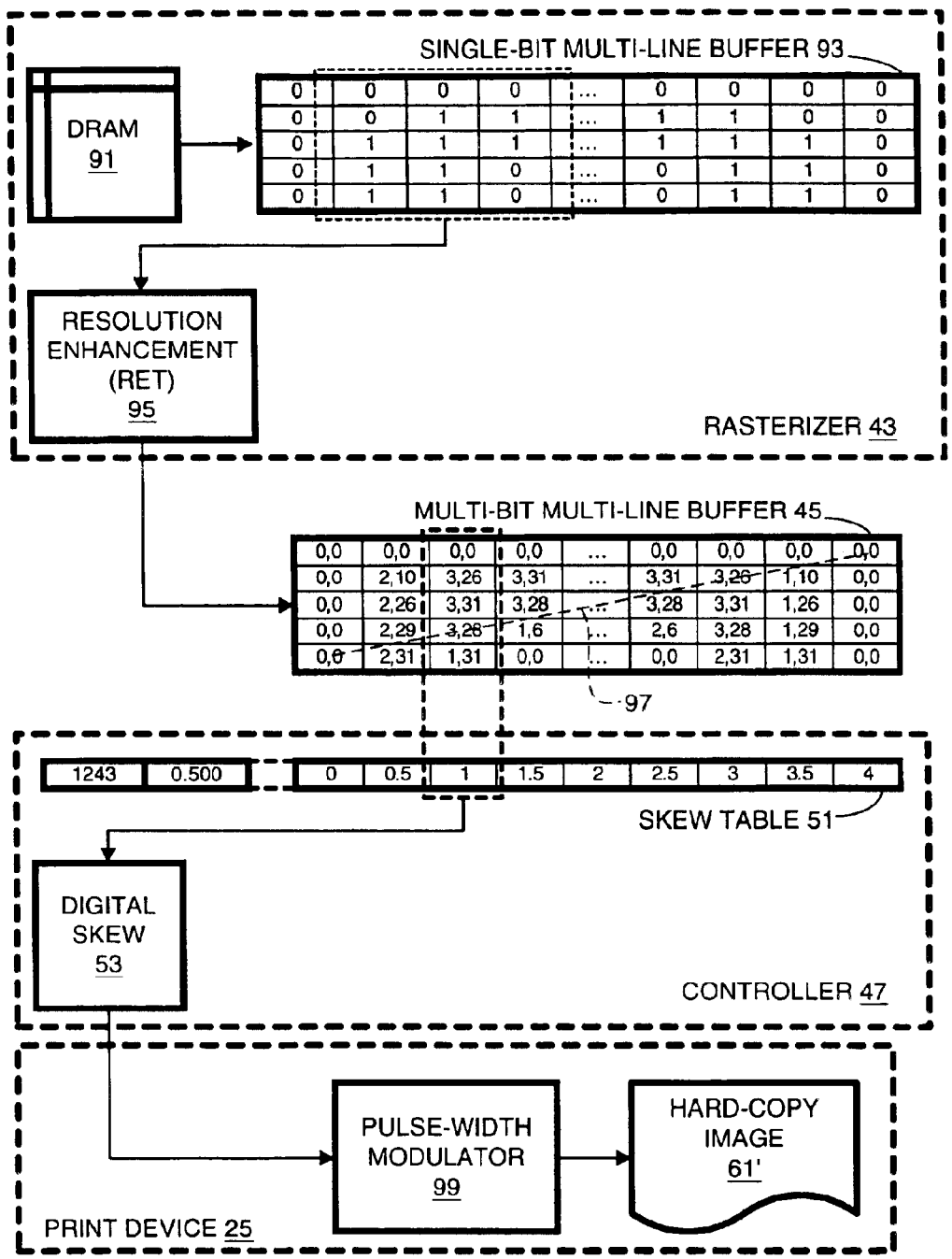
FIG. 3 is a flow diagram for print function of the imaging system of FIG. 1.

Additional details of a print operation are explained with reference to FIG. 3. Rasterizer 43 includes dynamic random access memory (DRAM) 91 for storing PCL data received from a host computer 10. As the PCL data is converted to raster image data, the later is stored in a 1-bit-per-pixel multi-line buffer 93.

Rasterizer 43 then converts the single-bit-per-pixel data according to a resolution-enhancement technology (RET) function 95. RET function 95 selects how much toner is applied to an image pixel and how that toner is distributed in the pixel. Toner is applied in multiples of $\frac{1}{32}$ of the amount required for full pixel coverage. Thus, each pixel is assigned a five-bit value to indicate how many thirty-seconds (of the maximal toner amount for a pixel) are to be applied.

Two additional bits of RET code are used to indicate how the specified amount of toner is to be distributed at a pixel. For example, toner can be centered in a pixel, applied to the left portion of the pixel, applied to the right portion of the pixel, or split between the right and left portions of the pixel. Two bits of RET image data are used to indicate which of these four distributions are selected. Note that in buffer 45, the data is shown as a two-dimensional vector. The first value, which assumes values from 0 to 3, indicates the toner distribution for a pixel. The second value, which assumes values form 0 to 31, indicates the amount of toner.

At any given time, the contents of buffer 45 represent a band of an image to be printed. For a true-fed sheet, each row of buffer 45 describes an activation pattern for laser as it generates one raster line on the sheet media. Each column in buffer 45 corresponds to a longitudinal raster-line pixel position. While buffer 45 is shown for expository purposes with 5×9 7-bit locations, in practice it is much larger, e.g., 120×4800 locations. If the data in buffer 45 is used to drive the laser directly when the sheet media is skewed, the resulting printed image will be skewed. For the printed image to be true, the data in buffer 45 must be altered in some sense to compensate for the sheet-feed skew.

To a first approximation, skew compensation conceptually involves "moving" pixels (with their toner amounts and distributions) from their respective positions in the uncompensated image to correspondingly different positions in the skew-compensated image. In system AP1, this movement is achieved in two stages. First, a row offset is determined as a function of table column position, which corresponds to position along a raster line in the uncompensated image. Then a column offset is determined as a function of the raster line being generated in the skew-compensated image. In other words, each raster line is begun either a little sooner or a little later than it would be without the offset.

The skew determined by controller 47 from skew detector 23 (FIG. 1) is used to generate skew table 51, which indicates raster-line (row) offsets as a function of raster position (column). Skew table 51 stores one value per column of buffer 45. Each value corresponds to a row offset. Thus, the first value 0 in the leftmost location corresponds for a zero row offset for the leftmost values in buffer 45. Similarly, the value 4 in the rightmost location of table 51 corresponds to an offset of four rows (raster lines) in buffer 45. A diagonal line 97 through buffer 45 in FIG. 3 is representative of the skew angle dictated by table 51.

Fractional entries in table 51 indicate that a weighted average of two rows of a column are to be used determining the amount of toner to be applied to a pixel in the compensated image. Thus, "2.5" in the sixth location of table 51 indicates that the pixels for the sixth pixel position of the current raster line indicates that the amount of toner the corresponding pixel of the compensated image is the evenly-weighted average of the pixels in the same column at two-row and three-row offsets. If the fractional part is greater than one-half, the greater offset row is given more weight. While skew table 51 of FIG. 3 corresponds to a linear interpolation, the invention provides for other interpolation functions, and for more neighboring pixels to be used in determining the amount of toner to be applied to a pixel in the compensated image.

The toner distribution for each pixel in the compensated image is determined from the toner distributions for the same two pixels in the uncompensated image used to determine toner amounts. In the following table, the toner distribution for a pixel in the compensated image is determined by finding the intersection of the row corresponding to the toner distribution from one uncompensated pixel and the column corresponding to the toner distribution for the other uncompensated pixel.

TABLE

Justification Function for Compensated Image

| PW Codes | 0-Split | 1-Left | 2-Right | 3 Center |
|---|---|---|---|---|
| 0-Split | 0-Split | 1-Left | 2-Right | 3-Center |
| 1-Left | 1-Left | 1-Left | 0-Split | 1-Left |
| 2-Right | 2-Right | 0-Split | 2-Right | 2-Right |
| 3-Center | 3-Center | 1-Left | 2-Right | 3-Center |

In other embodiments, the amount of toner for a pixel in the compensated image is a function of both the amounts and distributions in the pre-compensated image. Likewise, the distribution of toner in a pixel in the compensated image can be a function of both the distributions and amounts of pixels in the pre-compensated image.

Controller 47 uses table 51 to determine which pixels in the uncompensated image are to be used in determining the values for each pixel in the compensated image. The needed values are accessed from buffer 43 and provided to digital skew processor 53. Skew processor 53 uses table 51 to determine how the values for the compensated pixel are to be calculated from the data provided to it.

The resulting compensated data is used to drive pulse-width modulator 99 of printer device 25. The pulse widths determine the action of the laser of the laser printer media output portion of printer device 25 to achieve the desired toner amount and distribution for each pixel in the skew-compensated image.

Table 51 stores two values in addition to the row offset values. Before each raster line is written, the laser beam is detected two inches from the left margin of the sheet. In the event of a true feed, the left margin of the sheet is 2" (1200 pixels) from the detection point. In the event of skew, the left margin generally has some other value. System AP1 "predicts" a beginning left margin from the detected skew. In the example, the beginning left margin is 1243 pixels. Since the sheet is skewed, the left margin changes for each raster line. Since the print resolution is the same in both the feed and transverse directions, the column—column offset from one raster line to the next is the same as the row offset from one column to the next. Hence, the column-column offset is 0.500. The column—column offset is calculated to greater precision than the row offset to minimize errors that accumulate over the length of a page.

Alternative embodiments of the invention provide one or more of the functions described above. For example, there are print only, scan only, and fax only, embodiments. Different maximum media sizes are provided for. Larger media, e.g., tabloid, and smaller media, e.g., photo print sized, are provided for. The media can be paper, card stock, envelopes, photo-paper, transparencies, labels, etc.

Different media-feeding arrangements are provided for. For example, a cassette can be used for feeding fixed-size media. If this is the only blank media source, two fixed edge detectors can be used. If there are both fixed-size and variable-size media sources, then two fixed edge detectors plus a movable edge detector can be used. Alternatively, several fixed edge detectors can be used to accommodate various media widths and to enhance skew-detection precision. Media feeders have two movable guides can use two movable edge detectors. In general, the skew detector can either provide skew measurements or data from which skew determinations can be made (e.g., by a controller).

In the preferred embodiment, the rasterizer implements resolution enhancement technology. More or less sophisticated resolution-enhancement technology can be used. In addition, color diffusion can be implemented in various ways in the context of color printing and scanning.

In the case of color operations, the skew operation can also be used to assist color registration. For example, in some in-line color laser printers, four (magenta, cyan, yellow, and black) monochrome color images are applied to media or to a transfer belt with registration marks during a calibration run. The registration marks can be read for both displacement and skew. The skew can be used to generate skew-compensations between colors. The displacements can be handled in the same tables or separately. This approach allows mechanical constraints to be relaxed in the design of in-line color lasers.

The present invention has industrial applicability to computers, image processing, and communications generally. In general, the invention provides for sophisticated image processing for a very small marginal cost that is more than offset by relaxed mechanical tolerances and extended useful device lifetimes. Printers, scanners, fax machines, digital copiers, etc. can make use of the invention. These and other modifications to and variations upon the disclosed embodiments are provided for by the present invention, the scope of which is defined by the following claims.

What is claimed is:

1. An image-transfer system comprising:
   an image-transfer device for converting between a digital image and a hard-copy media image;
   a media-feeder for feeding media to said image-transfer device;
   a skew detector for detecting sheet-feed skew in said media;
   a memory for storing said digital image; and
   a controller for applying digital skew compensation to said digital image as a function of sheet-feed skew detected by said skew detector, said function indicates raster line offsets as a function of raster position, fractional raster-line offsets indicating interpolation weights for neighboring pixels.

2. An image-transfer system comprising:
   an image-transfer device for converting between a digital image and a hard-copy media image;

a media-feeder for feeding media to said image-transfer device;

a skew detector for detecting sheet-feed skew in said media;

a memory for storing said digital image, said memory, at any given time, holding less than half the data associated with said digital image; and a controller for applying digital skew compensation to said digital image as a function of sheet-feed skew detected by said skew detector.

3. A system as recited in claim 2 wherein said digital image data is transferred from said image-transfer device to said memory.

4. A system as recited in claim 2 wherein said compensated digital image data is transferred to said image-transfer device.

5. A media transfer method comprising the steps of:

feeding sheet media to a image-transfer device;

detecting media skew in said media as it is fed to said image-transfer device;

transferring between a hard-copy image and a digital image stored in digital memory; and digitally skewing said digital image as a function of said media skew, said function indicating raster line offsets as a function of raster position, fractional raster-line offsets indicating interpolation weights for neighboring pixels.

6. A media transfer method comprising:

feeding sheet media to an image-transfer device;

detecting media skew in said media as it is fed to said image-transfer device;

transferring between a hard-copy image and a digital image stored in digital memory so that less than half of said digital image is stored in said digital memory at any given time; and digitally skewing said digital image as a function of said media skew.

7. A method as recited in claim 6 wherein said digitally skewing step occurs after said transferring step.

8. A method as recited in claim 6 wherein said digitally skewing step occurs before said transferring step.

* * * * *